United States Patent Office 3,031,459
Patented Apr. 24, 1962

3,031,459
IMIDES
Charles Ferdinand Huebner, Chatham, N.J., assignor to Ciba Pharmaceutical Products, Inc., Summit, N.J., a corporation of New Jersey
No Drawing. Filed Jan. 11, 1960, Ser. No. 1,451
4 Claims. (Cl. 260—326)

The present invention relates to cyclo-aliphatic hydrocarbon-1,2-dicarboximide compounds, in which the cyclo-aliphatic hydrocarbon nucleus contains from five to seven, particularly six, ring carbon atoms, and which contain an aryl group attached to the 1-position. Depending on the number of ring carbon atoms of the cyclo-aliphatic hydrocarbon portion, one or more than one pair of neighboring carbon atoms may be linked by way of a double bond, or, in addition to the bond between the two carbon atoms, by an oxido group of the formula —O—. In addition to the above-mentioned carbocyclic aryl substituent, other groups, such as aliphatic hydrocarbons or functional groups, for example, halogen, e.g. chlorine, bromine and the like, hydroxyl, or any other suitable group may be attached to the ring system. Furthermore, carbon atoms of the cyclo-aliphatic hydrocarbon ring, which are not adjacent to one another, may be joined by way of a lower alkylene, e.g. methylene and the like, bridge or an oxido bridge, to form endocyclic cyclo-aliphatic hydrocarbon nuclei.

The aryl substituent in the 1-position is more especially a carbocyclic aryl radical, particularly a monocyclic carbocyclic aryl radical, e.g. phenyl or substituted phenyl, or a bicyclic carbocyclic aryl radical, e.g. 1-naphthyl, 2-naphthyl or corresponding substituted naphthyl radicals; substituents of such carbocyclic aryl radicals are, for example, lower alkyl, e.g. methyl, ethyl, n-propyl, isopropyl and the like, halogeno, e.g. fluoro, chloro, bromo and the like, halogeno-lower alkyl, e.g. trifluoromethyl, nitro, amino, such as N-unsubstituted amino, N-monosubstituted amino, for example, N-lower alkyl-amino, e.g. N-methylamino, N-ethylamino and the like, or N,N-disubstituted amino, for example, N,N-di-lower alkyl-amino, e.g. N,N-dimethylamino, N,N-diethylamino and the like, lower alkoxy, e.g. methoxy, ethoxy and the like, lower alkyl-mercapto, e.g. methylmercapto, ethylmercapto and the like, or any other suitable substituent. Other aryl radicals are, for example, heterocyclic aryl radicals, such as monocyclic azacyclic aryl, e.g. 2-pyridyl, 3-pyridyl or 4-pyridyl, monocyclic thiacyclic aryl, e.g. 2-thienyl and the like, or monocyclic oxacyclic aryl, e.g. 2-furyl and the like.

More particularly the invention relates to cyclo-aliphatic hydrocarbon-1,2-dicarboximide compounds of the formula

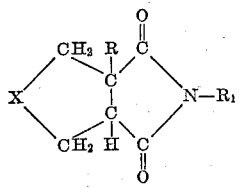

in which R represents monocyclic carbocyclic aryl or monocyclic azacyclic aryl, $R_1$ represents primarily hydrogen, as well as a hydrocarbon radical, such as lower aliphatic hydrocarbon, particularly lower alkyl, e.g. methyl, ethyl and the like, and X stands for one of the groups of the formulae

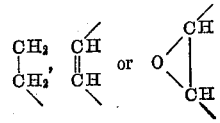

In the above formula, R represents phenyl, or substituted phenyl, whereby one or more than one of the same or of different substituents may be attached to any of the available positions. Such substituted phenyl radicals are, particularly, phenyl substituted by lower alkyl, e.g. 4-methyl-phenyl, 3-methyl-phenyl, 4-isopropyl-phenyl and the like, phenyl substituted by halogen, e.g. 4-fluoro-phenyl, 4-chloro-phenyl, 3,4-chloro-phenyl, 2,5-dichloro-phenyl, 4-bromo-phenyl and the like, phenyl substituted by halogeno-lower alkyl, e.g. 3-trifluoromethyl-phenyl, 4-trifluoromethyl-phenyl and the like, phenyl substituted by nitro, e.g. 2-nitro-phenyl, 3-nitro-phenyl, 4-nitro-phenyl and the like, phenyl substituted by amino, such as phenyl substituted by N-unsubstituted amino, e.g. 2-amino-phenyl, 3-amino-phenyl, 4-amino-phenyl and the like, phenyl substituted by N-lower alkyl-amino, e.g. 3-N-methylamino-phenyl, 4-N-methylamino-phenyl and the like, or phenyl substituted by N,N-di-lower alkyl-amino, e.g. 3-N,N-dimethylamino, 4-N,N-dimethylamino and the like, phenyl substituted by lower alkoxy, e.g. 3-methoxy-phenyl, 4-methoxy-phenyl, 3,4-dimethoxy-phenyl, 4-ethoxy-phenyl and the like, or any other substituted phenyl radical. It may also stand for pyridyl, e.g. 2-pyridyl, 3-pyridyl or 4-pyridyl.

The compounds of the invention may be present in the form of different isomers. For example, the two rings may be fused together in the trans-, or, more preferably, in the cis-configuration. Or, oxido rings fused onto the cycloalkyl portion may be cis- or trans- with respect to the aryl, particularly the phenyl, group. Furthermore, the compounds of the invention may be present in the form of racemates or of antipodes.

The compounds of the present invention show hypnotic activity with a significantly lower degree of toxic effects. They can, therefore, be used as improved nighttime hypnotic agents in cases of chronic or acute insomnia, as hypnotic agents prior to anesthesia, such as general anesthesia used in major surgery, or, in low doses, as daytime sedatives in conditions of overactiveness, nervousness, anxiety and the like. Certain compounds of the present invention also have skeletal muscle relaxant effects and are, therefore, useful as muscle relaxants, for example, during general anesthesia in surgery or to overcome abnormal muscle spasms. Compounds of the present invention can show additional pharmacological effects, such as, for example, anticonvulsive properties, and may, therefore, be used to relieve epileptic seizures of the petit or grand mal type. The compounds may also serve as intermediates for the preparation of other, pharmacologically useful compounds.

A particularly strong hypnotic activity is exhibited by compounds of the formulae

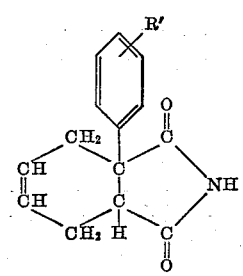

or

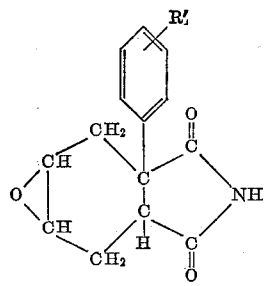

in which R' represents primarily hydrogen, but may also stand for lower alkyl, e.g. methyl, ethyl and the like, halogeno, e.g. fluoro, chloro, bromo and the like, halogeno-lower alkyl, e.g. trifluoromethyl, nitro, N-unsubstituted amino (or primary amino) and the like.

The new compounds of this invention may be used as medicaments in the form of pharmaceutical preparations, which contain the new compounds in admixture with a pharmaceutical organic or inorganic, solid or liquid carrier suitable for enteral, e.g. oral, administration. For making up the preparations there may be employed substances which do not react with the new compounds, such as lactose, starches, stearic acid, magnesium stearate, stearyl alcohol, talc, gums, or any other known carrier for medicaments. The pharmaceutical preparations may be in the solid form, for example, as capsules, tablets, dragees and the like. If desired, they may contain auxiliary substances, such as preserving agents, stabilizing agents, wetting or emulsifying agents and the like. They may also contain, in combination, other therapeutically useful substances. The dose level at which these compounds are used may vary considerably depending upon the condition of the patient, but the desirable dosage may be easily determined by the practicing physician.

The compounds of the present invention, particularly those of the formula

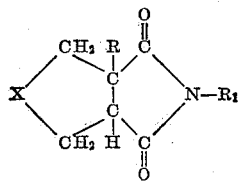

in which R and $R_1$ have the previously-given meaning, may be prepared, for example, by converting a cyclo-aliphatic hydrocarbon-1,2-dicarboxylic acid, in which the cyclo-aliphatic hydrocarbon nucleus has from five to seven, preferably six, ring carbon atoms, and which contains an aryl group attached to the 1-position, or, preferably, a functional derivative of such a dicarboxylic acid, especially a dicarboxylic acid of the formula

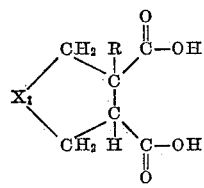

in which R has the previously-given meaning, and $X_1$ represents one of the groups of the formulae

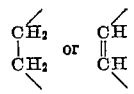

or, particularly, a reactive functional derivative of such an acid, into the desired 1,2-dicarboximide compound, and, if desired, replacing in a resulting cyclo-aliphatic hydrocarbon-1,2-dicarboximide compound, which contains a hydrogen atom attached to the imide nitrogen, such hydrogen by a hydrocarbon radical, and/or, if desired, oxidizing in a resulting cyclo-aliphatic hydrocarbon-1,2-dicarboximide compound, in which the cyclo-aliphatic hydrocarbon portion contains a double bond, particularly in a resulting dicarboximide compound of the formula

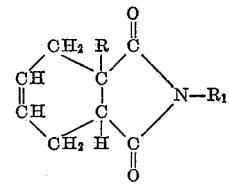

in which R and $R_1$ have the previously-given meaning, such double bond to form an epoxy-derivative of the resulting 1,2-dicarboximide compound, particularly a compound of the formula

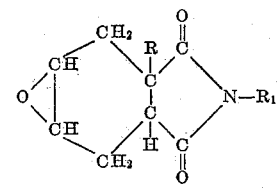

in which R and $R_1$ have the previously-given meaning, and/or, if desired, replacing in a resulting cyclo-aliphatic hydrocarbon-1,2-dicarboximide compound, in which the cyclo-aliphatic hydrocarbon portion contains a double bond, particularly in a resulting dicarboximide compound of the formula

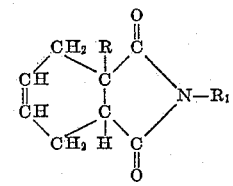

in which R and $R_1$ have the previously-given meaning, such double bond by a single bond to form a dihydro derivative of the resulting 1,2-dicarboximide compound, particularly a compound of the formula

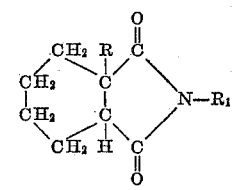

in which R and $R_1$ have the previously-given meaning, and/or, if desired, separating a resulting mixture of isomers into single isomers.

Suitable reactive derivatives of the above dicarboxylic acids used as starting materials for the formation of compounds of this invention are the anhydrides of such cyclo-aliphatic hydrocarbon-1,2-dicarboxylic acids. The conversion of such anhydrides to the desired imide compounds is carried out according to per se conventional methods.

In the course of the conversion of anhydrides to imides with the help of the various reagents listed hereinbelow, intermediates may be formed, which, under the reaction conditions or upon further treatment, particularly upon intramolecular acylation, can be converted into the desired imides.

For example, the formation of N-unsubstituted dicarboximides may be accomplished by treating the 1,2-dicarboxylic acid anhydrides with ammonia or an ammonia-furnishing reagent, which can lead to the formation of intermediarily formed, 1,2-dicarboxylic acid monoamides or functional derivatives thereof. Thus, the reaction of the anhydride with ammonia (for example, in the form of a concentrated aqueous solution) can yield the ammonium salt of the 1,2-dicarboxylic acid monoamide, which, upon heating, for example, while concentrating the reaction mixture at an elevated temperature, is converted into the desired imide. Additional reagents used for the formation of the desired dicarboximides from the corresponding anhydrides are, for example, ammonia-furnishing ammonium salts, particularly those of lower alkanoic acids, e.g. ammonium acetate and the like, which are preferably used in the presence of the corresponding acid, e.g. acetic acid and the like, and at an elevated temperature to ensure completion of the reaction. Formamide is a further reagent suitable for the conversion of the anhydrides to the desired dicarboximides; this reagent is preferably used at an elevated temperature and without the presence of an additional diluent.

Reagents, which furnish N-substituted dicarboximide compounds are, for example, N-lower aliphatic hydrocarbon-amines, such as N-lower alkyl-amines, e.g. N-methyl-amine, N-ethyl-amine and the like, or salts thereof. Again, these reagents may furnish intermediarily formed nitrogen-containing derivatives of the 1,2-dicarboxylic acid, primarily monoamides thereof or functional derivatives of such monoamides; upon internal acylation, brought about, for example, by heating, these intermediates are converted into desired dicarboximides. Whenever used in the form of the free base, these amines may be added, for example, to a mixture of the 1,2-dicarboxylic acid anhydride in acetic acid containing an alkali, e.g. sodium, potassium and the like, metal acetate; heating may be necessary to complete the internal acylation. Salts of the amines, particularly their mineral acid addition salts, e.g. hydrochlorides, hydrobromides, sulfates and the like, may also be employed, preferably in the presence of acetic acid and an alkali metal, e.g. sodium, potassium and the like, acetate, and while heating. Other reagents useful for the formation of N-substituted dicarboximides, are, for example, N-substituted formamides, such as, for example, N-lower alkyl-formamides, e.g. N-methyl-formamide and the like; treatment of the 1,2-dicarboxylic acid anhydride with such reagents is carried out at an elevated temperature.

Other derivatives of the 1,2-dicarboxylic acids suitable for the formation of the 1,2-dicarboximides are, for example, di-halides, particularly dichlorides, of such acids; when treated with ammonia or one of the above-mentioned amines, these acid halides may yield the desired imide compounds.

Nitrogen-containing derivates of the cyclo-aliphatic hydrocarbon-1,2-dicarboxylic acids, such as the 1,2-dicarboxylic acid monoamides or functional derivatives thereof, which, as has been mentioned hereinabove, can be intermediarily formed upon treatment of the 1,2-dicarboxylic acid anhydrides with various ammonia- and amine-furnishing reagents, may serve generally as starting materials for the formation of the compounds of the present invention. Thus, mononitriles, dinitriles or nitrile esters (for example, nitrile lower alkyl esters, e.g. nitrile methyl esters, nitrile ethyl esters and the like) of cycloaliphatic hydrocarbon-1,2-dicarboxylic acids may be used as starting materials; upon treatment with a condensing reagent, particularly with a strong Lewis acid, such as a strong mineral acid, e.g. sulfuric, phosphoric acid (preferably in the form of polyphosphoric acid) and the like, an acid anhydride, e.g. acetic acid anhydride and the like, reagents used in the Friedel-Crafts reaction, e.g. aluminum chloride, stannic chloride, zinc chloride and the like, or boron trifluoride (in the form of its etherate) or any other suitable condensing reagent, in the absence or presence of a diluent, these starting materials may be converted into the desired 1,2-dicarboximides. This reaction may also lead to the formation of the intermediarily formed cyclo-aliphatic hydrocarbon-1,2-dicarboxylic acid monoamides or functional derivatives thereof mentioned hereinbefore; upon internal acylation, for example, by heating, these intermediates are converted to the desired 1,2-dicarboximides.

The diamides, the diammonium salts or the mononitrile ammonium salt of the cyclo-aliphatic hydrocarbon-1,2-dicarboxylic acids, may also be used as starting materials; upon heating these compounds are converted into the desired imide compounds.

The products resulting from the above-mentioned procedures may be isolated according to known methods, e.g. crystallization, adsorption (for example, on alumina) and elution and the like, and are purified by conventional procedures, e.g. recrystallization and the like.

The above-mentioned starting materials are known, or, if new, may be prepared according to conventional methods used for analogous compounds; racemates or optically active antipodes may be used, whereby the resolution of a racemate is preferably carried out by forming salts of a compound containing a free carboxylic acid group with optically active bases, e.g. strychnine, brucine, 1-phenyl ethyl amine and the like, and separating the resulting mixture of different salts.

Compounds resulting from the above procedure may be converted into other compounds. Thus, the double bond in resulting compounds, such as, for example, in resulting 4-cyclohexene-1,2-dicarboximide compounds, may be oxidized to form epoxy-compounds, particularly 4,5 - epoxy-cyclohexane - 1,2 - dicarboximide compounds. Oxidation of the double bond may be carried out according to per se conventional methods, for example, by treatment with an organic peracid, such as, for example, a per-carboxylic acid, e.g. peracetic acid, perbenzoic acid, monoperphthalic acid and the like, or any other reagent suitable for the conversion of a double bond into an epoxy-ring; the reaction is carried out in a diluent, such as, for example, in a halogenated lower aliphatic hydrocarbon, e.g. methylene chloride, chloroform and the like, or any other inert solvent.

Furthermore, double bonds present in resulting 1,2-dicarboximides, such as, for example, in resulting 4-cyclohexene-1,2 dicarboximide compounds, may be removed by hydrogenation with the formation of cyclo-saturated aliphatic hydrocarbon-1,2-dicarboximide, particularly of cyclohexane-1,2-dicarboximide compounds. Hydrogenation may be carried out according to conventional methods, for example, by treatment of a resulting 2-cyclohexene-1,2-dicarboximide with hydrogen in the presence of a catalyst containing a metal of the eighth group of the periodic system, e.g. platinum oxide and the like, in an appropriate solvent, e.g. acetic acid and the like, or any other suitable hydrogenation method.

Or, substituents may be introduced into the aryl radical, particularly into a carbocyclic aryl radical, attached to the 1-position of resulting cyclo-aliphatic hydrocarbon-1,2-dicarboximide compounds. For example, upon treatment with a nitrating reagent, e.g. a mixture of sulfuric and nitric acid and the like, a nitro group may be introduced into a carbocyclic aryl radical; resulting mixtures of nitrated compounds may be separated, for example, on the basis of solubility differences. If desired, the nitro group in such compounds may then be converted into a N-unsubstituted amino group, for example, by treatment with hydrogen in the presence of a catalyst containing a metal of the eighth group of the periodic system, e.g. Raney nickel and the like, and an appropriate solvent, e.g. ethyl acetate, ethanol and the like, or into an N-substituted amino group, for example, an N,N-di-lower alkyl-amine, e.g. N,N-dimethylamino group, for example, by carrying out the above reduction in the presence of formaldehyde.

Other groups, such as, for example, halogen atoms, e.g. chlorine, bromine and the like, may also be introduced into the aryl, particularly carbocyclic aryl, radical; for example, an amino group present in this radical may be converted into a halogen atom by way of the Sandmeyer reaction, i.e. conversion of the amino compound into a diazo derivative and reaction of the latter with a cuprous halide, e.g. cuprous chloride, cuprous bromide and the like, according to conventional methods.

In resulting compounds containing an imide-nitrogen with hydrogen, such hydrogen may subsequently be replaced by a hydrocarbon, such as lower alkyl, radical, for instance, by reacting the N-unsubstituted 1,2-dicarboximide compound with an ester of a lower alkanol, with a lower diazo-alkane, especially diazomethane, or any other suitable reagent. Reactive esters of lower alkanols are those with strong inorganic or organic acids, such as mineral acids, e.g. hydrochloric, hydrobromic, sulfuric acid and the like, or organic sulfonic acids, e.g. p-toluene sulfonic acid and the like. The above-mentioned subsequent N-substitution is preferably carried out in the presence of a condensing agent which, together with the 1,2-dicarboximide, is capable of forming a metal compound, particularly an alkali metal, e.g. lithium, sodium, potassium and the like; amides, hydrides, hydrocarbons, lower alkanolates of such metals are particularly suitable and may be represented, for example, by sodium amide, sodium hydride, butyl lithium, phenyl potassium, phenyl lithium, potassium tertiary butylate, potassium tertiary amylate and the like.

Mixtures of resulting isomers may be separated into pure isomers according to conventional methods. For example, mixtures of racemates may be separated into individual racemic compounds by methods, which are, for example, based on physico-chemical differences, such as solubility, adsorbability and the like, existing between the single isomers. Thus, mixtures of racemates may be separated by fractionate crystallization, by fractionated distillation and the like.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 10.0 g. of 1-phenyl-4-cyclohexene-1,2-dicarboxylic acid in 100 ml. of acetic acid anhydride is refluxed for five hours. The solution is evaporated under reduced pressure and the oily residue, containing the 1-phenyl-4-cyclohexene-1,2-dicarboxylic acid anhydride is used without further purification.

The crude 1-phenyl-4-cyclohexene-1,2-dicarboxylic acid anhydride is dissolved in 50 ml. of acetic acid, an excess of 10.0 g. of ammonium acetate is added, and the reaction mixture is refluxed for four hours. Most of the acetic acid is then distilled off under reduced pressure, the residue is diluted with water, the crystalline precipitate is filtered off and washed with water. The resulting 1-phenyl-4-cyclohexene-1,2-dicarboximide of the formula

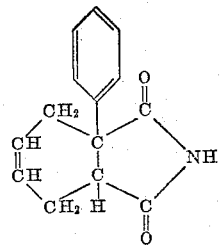

is recrystallized from ethanol and melts at 145–146°.
1-phenyl-4-cyclohexene-1,2-dicarboxylic acid anhydride, used as the starting material in the above reaction, may be replaced by other starting materials, such as, for example, 1-(3-methyl-phenyl)-4-cyclohexene-1,2-dicarboxylic acid anhydride,
1-(4-fluoro-phenyl)-4-cyclohexene-1,2-dicarboxylic acid anhydride
1-(4-bromo-phenyl)-4-cyclohexene-1,2-dicarboxylic acid anhydride,
1-(2,5-dichloro-phenyl)-4-cyclohexene-1,2-dicarboxylic acid anhydride,
1-(4-methoxy-phenyl)-4-cyclohexene-1,2-dicarboxylic acid anhydride,
1-(3,4,5-trimethoxy-phenyl)-4-cyclohexene-1,2-dicarboxylic acid anhydride,
1-(4-nitro-phenyl)-4-cyclohexene-1,2-dicarboxylic acid anhydride,
1-(4-amino-phenyl)-4-cyclohexene-1,2-dicarboxylic acid anhydride,
1-(3-pyridyl)-4-cyclohexene-1,2-dicarboxylic acid anhydride,
1-(4-pyridyl)-4-cyclohexene-1,2-dicarboxylic acid anhydride and the like;

upon treatment with ammonium acetate in the presence of acetic acid, these, 1,2-dicarboxylic acid anhydrides furnish, for example, 1-(3-methyl-phenyl)-4-cyclohexene-1,2-dicarboximide,
1-(4-fluoro-phenyl)-4-cyclohexene-1,2-dicarboximide,
1-(4-bromo-phenyl)-4-cyclohexene-1,2-dicarboximide,
1-(2,5-dichloro-phenyl)-4-cyclohexene-1,2-dicarboximide,
1-(4-methoxy-phenyl)-4-cyclohexene-1,2-dicarboximide,
1-(3,4,5-trimethoxy-phenyl)-4-cyclohexene-1,2-dicarboximide,
1-(4-nitro-phenyl)-4-cyclohexene-1,2-dicarboximide,
1-(4-amino-phenyl)-4-cyclohexene-1,2-dicarboximide,
1-(3-pyridyl)-4-cyclo-hexene-1,2-dicarboximide,
1-(4-pyridyl)-4-cyclohexene-1,2-carboximide and the like.

*Example 2*

To a solution of 1.0 g. of 4-phenyl-4-cyclohexene-1,2-dicarboximide (Example 1) in 5 ml. of chloroform is added 14.5 ml. of a 0.3 molar solution of perbenzoic acid in chloroform. After standing overnight at room temperature, the benzoic acid is removed by extraction with aqueous sodium hydrogen carbonate and the remaining chloroform solution is evaporated to dryness. The residue is crystallized from a mixture of ethanol and water; the resulting 4,5-epoxy-1-phenyl-cyclohexane-1,2-dicarboximide of the formula

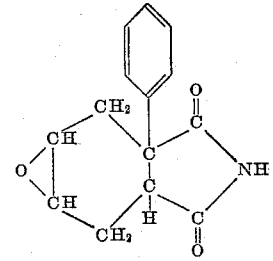

melts at 156°.

By treatment of one of the 4-cyclohexene-1,2-dicarboximides mentioned in Example 1 with perbenzoic acid as shown in the above procedure, 4,5-epoxy-1-(3-methyl-phenyl)-cyclohexane-1,2-dicarboximide,
4,5-epoxy-1-(4-fluoro-phenyl)-cyclohexane-1,2-dicarboximide,
1-(4-bromo-phenyl)-4,5-epoxy-cyclohexane-1,2-dicarboximide,
1-(2,5-dichloro-phenyl)-4,5-epoxy-cyclohexane-1,2-dicarboximide, 4,5-epoxy-1-(4-methoxy-phenyl)-cyclohexane-1,2 - dicarboximide,
4,5-epoxy-1-(3,4,5-trimethoxy-phenyl) - cyclohexane-1,2-dicarboximide,
4,5-epoxy-1-(4-nitro-phenyl)-cyclohexane - 1,2-dicarboximide,
1-(4-amino-phenyl)-4,5-epoxy-cyclohexane-1,2 - dicarboximide,
4,5-epoxy-1-(3-pyridyl)-cyclohexane-1,2-dicarboximide,
4,5-epoxy-1-(4-pyridyl)-cyclohexane-1,2-dicarboximide, and the like, may be formed.

*Example 3*

A solution of 1.0 g. of 1-phenyl-4-cyclohexene-1,2-dicarboximide (Example 1) in 10 ml. of acetic acid is treated with hydrogen in the presence of 0.1 g. of platinum oxide. One molar equivalent of hydrogen is absorbed within one hour, whereupon the hydrogenation is interrupted. The catalyst is filtered off, the filtrate is concentrated to dryness under reduced pressure and the residue is recrystallized from ethanol. The resulting 1-phenyl-cyclohexane-1,2-dicarboximide of the formula

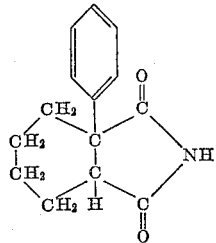

melts at 115°.

Upon treatment with catalytically activated hydrogen according to the above procedure, the 4-cyclohexene-1,2-dicarboximide compounds mentioned in Example 1 may be converted into the corresponding cyclohexane-1,2-dicarboximide compounds, such as, for example, 1-(3-methyl-phenyl)-cyclohexane - 1,2 - dicarboximide, 1-(4-fluoro-phenyl)-cyclohexane - 1,2 - dicarboximide, 1 - (4-bromo-phenyl)-cyclohexane-1,2-dicarboximide, 1-(2,5-dichloro-phenyl)-cyclohexane - 1,2 - dicarboximide, 1 - (4-methoxy-phenyl)-cyclohexane-1,2-dicarboximide, 1-(3,4,5 - trimethoxy-phenyl)-cyclohexane-1,2-dicarboximide, 1-(4-nitro-phenyl)-cyclohexane - 1,2 - dicarboximide, 1-(4-amino-phenyl) - cyclohexane-1,2-dicarboximide, 1-(3-pyridyl) - cyclohexane - 1,2 - dicarboximide, 1-(4-pyridyl)-cyclohexane-1,2-dicarboximide and the like.

*Example 4*

To a solution of 20.0 g. of 1-phenyl-4-cyclohexene-1,2-dicarboximide in 200 ml. of toluene is added portionwise 4.0 g. of sodium amide while keeping a temperature of about 80° and an atmosphere of nitrogen. The reaction mixture is maintained at that temperature for about three hours while stirring and is then cooled and placed into a pressure vessel. 15.0 g. of methyl iodide is added and the reaction mixture is heated in the closed vessel to about 130°. The resulting toluene solution is washed with dilute aqueous sodium hydroxide and water, dried over sodium sulfate and evaporated. The residue contains the desired N-methyl-1-phenyl-4-cyclohexene-1,2-dicarboximide, which can be isolated according to standard methods.

What is claimed is:
1. A compound of the formula

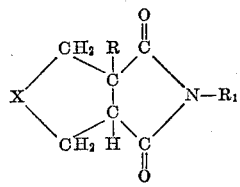

in which R represents a member of the group consisting of pyridyl, phenyl and phenyl substituted by lower alkyl, halogen, halogeno-lower alkyl, nitro, amino, N-lower alkyl-amino, N,N-di-lower alkyl-amino and lower alkoxy, $R_1$ represents a member of the group consisting of hydrogen and lower alkyl, and X stands for a member of the group consisting of the formulae

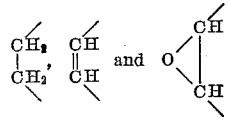

2. 1-phenyl-4-cyclohexene-1,2-dicarboximide.
3. 1-phenyl-cyclohexane-1,2-dicarboximide.
4. 4,5-epoxy-1-phenyl-cyclohexane-1,2-dicarboximide.

References Cited in the file of this patent
UNITED STATES PATENTS

| 2,816,897 | Wolf | Dec. 17, 1957 |
| 2,897,208 | Phillips et al. | July 28, 1959 |

FOREIGN PATENTS

| 530,333 | Canada | Sept. 11, 1956 |

OTHER REFERENCES

Morgan et al.: J. American Chemical Society, vol. 66, pp. 404–407 (1944).